(12) United States Patent
Zhang et al.

(10) Patent No.: US 9,338,168 B2
(45) Date of Patent: May 10, 2016

(54) METHOD AND DEVICE FOR CONTROLLING DIGITAL LIVING NETWORK ALLIANCE CONTENTS

(75) Inventors: Jiani Zhang, Shenzhen (CN); Huibin Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 45 days.

(21) Appl. No.: 14/240,467

(22) PCT Filed: Nov. 29, 2011

(86) PCT No.: PCT/CN2011/083136
§ 371 (c)(1),
(2), (4) Date: Feb. 24, 2014

(87) PCT Pub. No.: WO2012/151967
PCT Pub. Date: Nov. 15, 2012

(65) Prior Publication Data
US 2014/0215579 A1    Jul. 31, 2014

(30) Foreign Application Priority Data

Sep. 30, 2011   (CN) .......................... 2011 1 0293708

(51) Int. Cl.
*H04L 29/06*     (2006.01)
*H04L 12/28*    (2006.01)
*H04L 29/12*    (2006.01)

(52) U.S. Cl.
CPC ............ *H04L 63/10* (2013.01); *H04L 12/2803* (2013.01); *H04L 63/101* (2013.01); *H04L 61/6022* (2013.01)

(58) Field of Classification Search
CPC . G06F 21/10; G06F 2221/2107; G06F 21/31; H04L 12/2803; H04L 63/10; H04L 63/101; H04L 63/061; H04L 63/065; H04L 61/6022
USPC ............... 726/1–4, 26–30; 709/203, 225, 229
See application file for complete search history.

(56) References Cited

U.S. PATENT DOCUMENTS 7,337,219 B1 * 2/2008 Meenan ............... H04L 12/2807
                                                        709/220
2006/0288227 A1 * 12/2006 Kalofonos .......... H04L 12/2803
                                                        713/182

(Continued)

FOREIGN PATENT DOCUMENTS

CN          101248613 A      8/2008
CN          101438256 A      5/2009

(Continued)

OTHER PUBLICATIONS

International Search Report of PCT/CN2011/083136 dated Jun. 15, 2011.

*Primary Examiner* — Shanto M Abedin
(74) *Attorney, Agent, or Firm* — Banner & Witcoff, Ltd.

(57) ABSTRACT

The present document provides a method and apparatus for controlling digital living network alliance contents. One Media Access Control (MAC) recording unit is extended at the Digital Living Network Alliance (DLNA) device side for recording which MAC addresses are permitted to access or use the service of the DLNA device or prohibited from accessing or using the service of the DLNA device; one service control program is extended at the DLNA device side, and when there is another DLNA device transmitting a request to the DLNA device, the MAC address of the DLNA device is compared with the MAC address recorded by the MAC recording unit; and if the MAC address of the DLNA device is in the permission list or the MAC address of the DLNA device is not in the prohibition list, then the request will be permitted; otherwise the request will be rejected.

8 Claims, 2 Drawing Sheets

(56) References Cited

U.S. PATENT DOCUMENTS

| | | | |
|---|---|---|---|
| 2007/0211728 A1* | 9/2007 | Kim et al. | 370/395.5 |
| 2007/0250870 A1 | 10/2007 | Kim et al. | |
| 2008/0222730 A1* | 9/2008 | Ford | H04L 63/0236 |
| | | | 726/25 |
| 2008/0250151 A1 | 10/2008 | Tomita | |
| 2009/0100465 A1* | 4/2009 | Kulakowski | 725/39 |
| 2009/0287820 A1* | 11/2009 | Okazaki | 709/225 |
| 2010/0235386 A1* | 9/2010 | Zhao | H04N 5/44513 |
| | | | 707/769 |
| 2010/0235869 A1* | 9/2010 | Zhao et al. | 725/82 |
| 2011/0055928 A1* | 3/2011 | Brindza | 726/26 |
| 2011/0107436 A1* | 5/2011 | Cholas | H04N 21/2541 |
| | | | 726/29 |
| 2012/0117627 A1* | 5/2012 | Huang et al. | 726/4 |

FOREIGN PATENT DOCUMENTS

| | | |
|---|---|---|
| CN | 101523801 A | 9/2009 |
| JP | 2007142629 A | 6/2007 |
| JP | 2008048055 A | 2/2008 |
| JP | 2008165333 A | 7/2008 |
| JP | 2008244726 A | 10/2008 |
| JP | 2009147571 A | 7/2009 |
| JP | 2010056966 A | 3/2010 |
| JP | 2011061478 A | 3/2011 |
| JP | 2012249240 A | 12/2012 |
| JP | 2013511887 A | 4/2013 |
| JP | 2014524211 A | 9/2014 |
| WO | 2010/095990 A1 | 8/2010 |

\* cited by examiner

METHOD AND DEVICE FOR CONTROLLING DIGITAL LIVING NETWORK ALLIANCE CONTENTS

TECHNICAL FIELD

The present document relates to the field of communication technologies, and in particular, to a method and apparatus for controlling digital living network alliance contents.

BACKGROUND OF THE RELATED ART

The Digital Living Network Alliance (DLNA) is initiated and established by companies such as Sony, Intel and Microsoft etc., which is intended to solve interconnection and interworking between the wireless network and the wired network including personal PCs, consumer appliances and mobile devices.

The Universal Plug and Play (UPnP) is a core part of a easy-use design oriented "digital home" DLNA network protocol set, is an ordinary way for a device to be connected to the "digital home" network, is a common protocol for a device to communicate through the "digital home" network, and is established on a widely accepted and universally applied Internet protocol, and devices from different manufacturers can very easily work together, thus implementing sharing and computing contents "at any time and any location". The UPnP defines the interoperability mechanism between devices in five aspects, i.e., addressing, searching, controlling, event and behavior of the device.

The UPnP defines that, after one device accesses a network and obtains an IP address, then the device broadcasts its service to the control unit on the network using a Simple Service Discovery Protocol (SSDP), after the control unit accesses the network and obtains an IP address, the control unit transmits one searching request to search for an interested device on the network using the SSDP protocol. Under both cases, the basic information exchange is discovery message, which only includes little information about the device, such as device type, device name and one pointer pointing to the Extensible Markup Language (XML) device description document.

After the control unit has "discovered" one device, it still knows little about the "device", and at this time, it needs to find a description file of the device according to the Uniform Resource Locator (URL) of the device description document of the discovery message, and read more description information from these files. The range of the description information is very wide, and is generally provided by a manufacturer of the device. The description information of the device includes: a mode name and a mode number of the control, a device sequence number, a manufacturer name, a URL of the WEB of the manufacturer, and a URL of description information of the embedded device or service, and device control, device event and device expression. Such information is generally stored in a specific XML file.

After the control pointer finds the device description, an operation to be performed will be extracted from the description, and all services will be understood, and in order to control a certain device, the device point must first transmit one control behavior request, to request the device to start the service, and then transmit corresponding control message according to the URL of the device, the control message is the information of Simple Object Access Protocol (SOAP) format which is put in the XML file. Finally, the service will returns response information, to indicate whether the service is successful or failed.

Since the UPnP protocol does not define a security mechanism, the UPnP-enabled device is completely exposed to an unprotected state, such that any control unit which is in the same network segment as the UPnP device can operate the UPnP device, and therefore, how to ensure the security of the UPnP device becomes a problem to be solved.

SUMMARY OF THE INVENTION

The purpose of the present document provides a method and device for controlling digital living network alliance contents, to ensure the security of the UPnP device.

In order to implement the above purpose, the present document provides a method for controlling digital living network alliance contents, wherein, one MAC recording unit is extended at a DLNA device side for recording which MAC addresses are permitted to access or use the service of the DLNA device or prohibited from accessing or using the service of the DLNA device;

one service control program is extended at the DLNA device side, and when there is another DLNA device transmitting a request to the DLNA device, the MAC address of the DLNA device is compared with the MAC address recorded by the MAC recording unit; and if the MAC address of the DLNA device is in a permission list recorded by the MAC recording unit or the MAC address of the DLNA device is not in the prohibition list recorded by the MAC recording unit, then the request will be permitted; otherwise the request will be rejected.

Further, the request includes requiring a current DLNA device to provide XML file of the service or requiring the service by using a service command.

Further, before the MAC address of the DLNA device is compared with the MAC address recorded by the MAC recording unit, the request transmitted by another DLNA device is parsed, to parse out an MAC address of the other DLNA device.

Further, if the MAC address of the DLNA device is in the permission list, the parsed-out IP data package is not modified, and the upper level service permits the control unit to obtain a device and service descriptor and permits the control unit to request; otherwise, a FLAG tag is added in the parsed-out IP package, and the request is directly rejected by the DLNA device according to the FLAG.

Further, if the MAC address of the DLNA device is not in the prohibition list, the parsed-out IP data package is not modified, and the upper level service permits the control unit to obtain the device and service descriptor and permits the control unit to request; otherwise, a FLAG tag is added in the parsed-out IP package, and the request is directly rejected by the DLNA device according to the FLAG.

The present document further provides an apparatus for controlling digital living network alliance contents, wherein, the device includes a DLNA module, an MAC control module, and an MAC list module; wherein, the MAC list module stores information about which MAC addresses are permitted to access or use the service of a DLNA device or prohibited from accessing or using the service of the DLNA device;

the DLNA module obtains a request instruction transmitted by another DLNA device and forwards the instruction information to the MAC control module;

the MAC control module compares the MAC address transmitted by the another DLNA device with the MAC address recorded by the MAC list module, if the MAC address of the DLNA device is in the permission list which is recorded or the MAC address of the DLNA device is not in the prohibition list which is recorded, then the request will be permitted; otherwise the request will be rejected.

Further, the request includes requiring a current DLNA device to provide XML file of the service or requiring the service by using a service command.

Further, before comparing the MAC address of the DLNA device with the MAC address stored by the MAC list module, the MAC control module parses the request transmitted by another DLNA device, to parse out an MAC address of the other DLNA device.

Further, if the MAC address of the DLNA device is in the permission list, the parsed-out IP data package is not modified, and the upper level service permits the control module to obtain the device and service descriptor and permits the control module to request; otherwise, a FLAG tag is added in the parsed-out IP package, and the request is directly rejected by the DLNA device according to the FLAG.

Further, if the MAC address of the DLNA device is not in the prohibition list, the parsed-out IP data package is not modified, and the upper level service permits the control module to obtain the device and service descriptor and permits the control module to request; otherwise, a FLAG tag is added in the parsed-out IP package, and the request is directly rejected by the DLNA device according to the FLAG.

In conclusion, with the present document, there will be following beneficial effects:

The technical solution of the present document can well solve the potential safety hazard problem of the UPnP protocol used by the DLNA device, which well ensures the security of multimedia data.

PREFERRED EMBODIMENTS OF THE INVENTION

The technical solution of the present document will be described in detail in conjunction with accompanying drawings and specific embodiments hereinafter. In the embodiment described below, controlling DLNA multimedia contents by using the MAC address in the mechanism of the UPnP used by the DLNA is taken as an example for illustration.

The embodiment provides a method for controlling DLNA multimedia contents using an MAC address.

An MAC recording unit is extended at the DLNA device side of a UPnP node providing the service for recording which MAC addresses are permitted to access or use the service of the DLNA device (or prohibited from accessing or using the service of the DLNA device).

A service control program is extended at the DLNA device side of the UPnP node providing the service, and when there is another DLNA device requiring the current DLNA device to provide an XML file of the service or requiring the service by using a service command, the MAC address of the DLNA device is compared with the MAC address in the MAC recording unit.

If the MAC address of the DLNA device is in a permission list recorded by the MAC recording unit, the service required by it and an XML file of related service expression are provided; otherwise, the related service and the XML file of the related service expression are rejected to be provided.

If the MAC address of the DLNA device is not in a prohibition list recorded by the MAC recording unit, the service required by it and an XML file of related service expression are provided; otherwise, the related service and the XML file of the related service expression are rejected to be provided.

The implementation method of the present document will be described in conjunction with accompanying drawings hereinafter.

Figure 1:
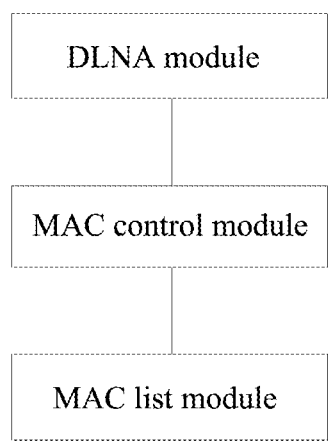
FIG. 1 is a diagram of a DLNA device for controlling DLNA contents according to an embodiment of the present document.

As shown in FIG. 1, a diagram of a DLNA apparatus for controlling DLNA contents according to an embodiment of the present document is illustrated. In this embodiment, a DLNA device will be described using a 3G wireless router as an example, and the 3G wireless router is connected to multiple terminals such as PCs by means of WIFI. The terminal devices such as PCs transmit a request to the DLNA device, the request includes requiring the current DLNA device to provide XML file of the service or requiring the service by using a service command, such as, requesting to obtain the contents such as movies, pictures etc. on the DLNA. The DLNA permits or rejects the request from the terminal devices such as PCs etc. according to their MAC addresses. The apparatus includes a DLNA module, an MAC control module and an MAC list module.

The DLNA control unit in FIG. 1 is a DLNA control unit which interacts with the DLNA device, and is generally located on another DLNA device which interacts with the local DLNA device, and is mainly used for obtaining a device and service descriptor and obtaining related services from the device of the present document.

The DLNA module obtains a request instruction from another DLNA device and forwards the instruction information to the MAC control module, to provide a service descriptor and related services of the DLNA device to the control unit.

The MAC control module of the DLNA device of the present embodiment is mainly used for parsing a data package transmitted by the control unit of the DLNA device to parse out the MAC address therein, and reading an MAC permission list stored in the FLASH of the device to determine whether the MAC address of the control unit is in the MAC permission list, if it is in the permission list, the IP data package which is parsed out at the MAC layer is not modified, and thus the upper level service can permit the control unit to obtain the device and service descriptor and permit it to obtain the related service; otherwise, a FLAG tag is added in the parsed-out IP package, and the related request from the control unit is directly rejected by the DLNA device according to the FLAG.

The data package transmitted by the control unit of the DLNA device is parsed to parse out the MAC address therein, and the MAC prohibition list stored in the FLASH in the present document is read to determine whether the MAC address of the control unit is in the MAC prohibition list, if it is not in the prohibition list, the IP data package which is parsed out at the MAC layer is not modified, and thus the upper level service can permit the control unit to obtain the device and service descriptor and permit it to obtain the related service; otherwise, a FLAG tag is added in the parsed-out IP package, and the related request from the control unit is directly rejected by the DLNA device according to the FLAG.

The MAC list module stores an MAC control list in the FLASH for a DLNA device of the present document, mainly stores an MAC address of a control unit permitted by a DLNA device and a permission or prohibition tag, i.e., storing information about which MAC addresses are permitted to access or use the service of the DLNA device or prohibited from accessing or using the service of the DLNA device.

Figure 2:
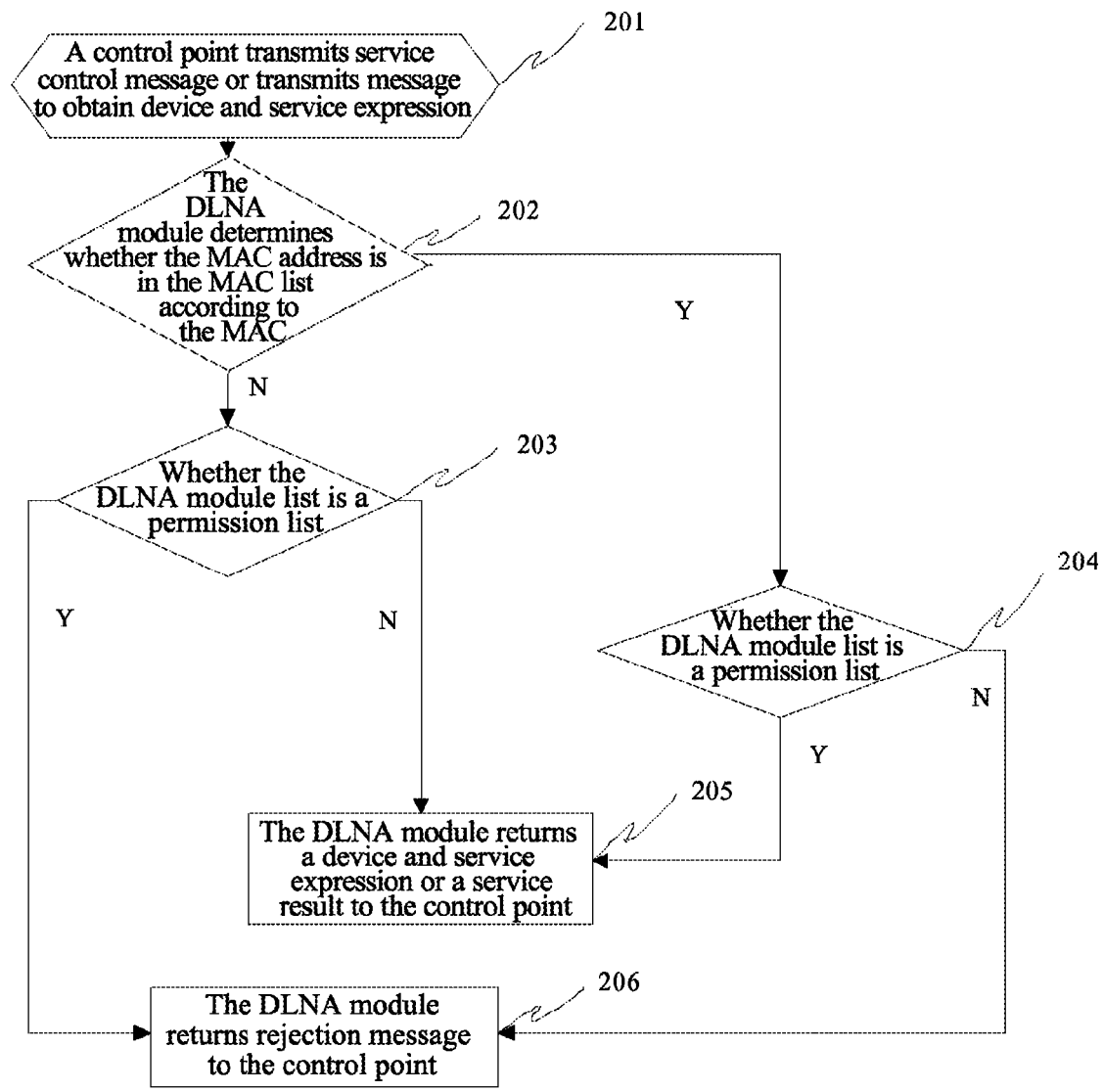
FIG. 2 is a diagram of a flowchart of a method for controlling DLNA multimedia contents through an MAC address according to an embodiment of the present document.

Please refer to FIG. 2, which is a diagram of a flowchart of a method for controlling DLNA multimedia contents through an MAC address according to an embodiment of the present document, and includes the following steps.

In step 201, the DLNA control unit transmits service control message or transmits message to obtain the device and service expression, and the function starts, and it is to turn to step 202;

In step 202, the DLNA device receives related control message and then performs related parsing to parse out an MAC address of the source address, and determines whether the MAC address is in the MAC list stored in the DLNA device of the present document, if so, it is to turn to step 204; otherwise, it is to turn to step 203;

In step 203, whether the DLNA module list is a permission list is determined, if so, it is to turn to step 206; otherwise, it is to turn to step 205;

In step 204, whether the DLNA module list is a permission list is determined, if so, it is to turn to step 205; otherwise, it is to turn to step 206;

In step 205, the DLNA module returns a device or service expression or a service result to the control unit in accordance with a normal process of the original DLNA;

In step 206, the DLNA module returns rejection message to the control unit.

The technical solution described in the above embodiments can well solve the potential safety hazard problem of the UPnP protocol used by the DLNA device, which well ensures the security of multimedia data.

By the technical solution of the above embodiments, only a user of an MAC address which is set to be permitted can be permitted and use the service of the DLNA device of this technology and obtain an XML file of the device and service description; and only a user of an MAC address which is set to be prohibited can not be permitted and use the service of the DLNA device of this technology and obtain the XML file of the device and service description, which ensures the security and privacy of the use of the DLNA device.

Of course, the invention can have various implementations, and those skilled in the art can make various corresponding changes or variations according to the present document without departing from the spirit and substance thereof of the present document. Any of modification, equivalent and improvement etc., which is made within the spirit and principle of the present document, should be contained within the protection scope of the present document.

What is claimed is:

1. A method for controlling digital living network alliance contents, comprising:
    extending one Media Access Control (MAC) recording unit at a Digital Living Network Alliance (DLNA) device for recording which MAC addresses are permitted to access or use a service of the DLNA device or prohibited from accessing or using the service of the DLNA device;
    extending one service control program at the DLNA device, and when there is another DLNA device transmitting a request to the DLNA device, comparing a MAC address of the another DLNA device with the MAC addresses recorded by the MAC recording unit; and
    determining whether the MAC address of the another DLNA device is in a MAC list recorded by the MAC recording unit,
    if so, determining whether the list is a permission list, permitting the request when the list is a permission list, otherwise rejecting the request;
    if not, determining whether the list is the permission list, permitting the request when the list is not a permission list, otherwise rejecting the request;
    wherein, if the MAC address of the another DLNA device is not in the list, and the list is not the permission list, then it is determined that the list is a prohibition list, a parsed-out IP data package is not modified, and an upper level service permits a control unit to obtain a device and service descriptor and permits the request; otherwise, a FLAG tag is added in the parsed-out IP data package, and the request is directly rejected by the DLNA device according to the FLAG.

2. The method according to claim 1, wherein, the request comprises requiring a current DLNA device to provide Extensive Extensible Markup Language (XML) file of the service or requiring the service by using a service command.

3. The method according to claim 1, wherein, before the MAC address of the another DLNA device is compared with the MAC addresses recorded by the MAC recording unit, the method further comprises: parsing the request transmitted by the another DLNA device to parse out the MAC address of the other DLNA device.

4. The method according to claim 1, wherein, if the MAC address of the another DLNA device is in the permission list, the parsed-out IP data package is not modified, and the upper level service permits the control unit to obtain the device and service descriptor and permits the request; otherwise, the FLAG tag is added in the parsed-out IP data package, and the request is directly rejected by the DLNA device according to the FLAG.

5. An apparatus for controlling digital living network alliance contents, wherein, the apparatus comprises a processor and a memory; wherein,
    the memory is configured to store information about which MAC addresses are permitted to access or use a service of a DLNA device or prohibited from accessing or using the service of the DLNA device;
    the processor is configured to:
        obtain a request transmitted by another DLNA device, compare a MAC address transmitted by the another DLNA device with the MAC addresses stored by the memory, determine whether the MAC address of the another DLNA device is in a MAC list stored by the memory,
        if so, determine whether the list is a permission list, permit the request when the list is the permission list, otherwise reject the request;
        if not, determine whether the list is the permission list, permit the request when the list is not the permission list, otherwise reject the request;
    wherein, the processor is further configured to:
    if the MAC address of the another DLNA device is not in the list, and the list is not the permission list, then determine that the list is a prohibition list, not modify a parsed-out IP data package, permit the request; otherwise, add a FLAG tag in the parsed-out IP data package, and reject the request according to the FLAG.

6. The apparatus according to claim 5, wherein, the request comprises requiring a current DLNA device to provide Extensible Markup Language (XML) file of the service or requiring the service by using a service command.

7. The apparatus according to claim 5, wherein, the processor is further configured to:

before comparing the MAC address of the another DLNA device with the MAC addresses stored by the memory, parse the request transmitted by the another DLNA device to parse out the MAC address of the another DLNA device.

8. The apparatus according to claim 5, wherein, the processor is further configured to:
if the MAC address of the another DLNA device is in the permission list, modify the parsed-out IP data package, and permit the request of the another DLNA device; otherwise, add the FLAG tag in the parsed-out IP data package, and directly reject the request according to the FLAG.

\* \* \* \* \*